United States Patent
Sykora et al.

(10) Patent No.: US 9,135,395 B2
(45) Date of Patent: Sep. 15, 2015

(54) ELEMENT SPECIFIC VARIABLE TRANSLATION

(75) Inventors: Richard A. Sykora, Stow, OH (US); Jack A. Zucker, South Euclid, OH (US); David W. Comeau, Auburn Township, OH (US); Yue Zhang, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 614 days.

(21) Appl. No.: 13/458,538

(22) Filed: Apr. 27, 2012

(65) Prior Publication Data

US 2012/0277884 A1 Nov. 1, 2012

Related U.S. Application Data

(60) Provisional application No. 61/480,988, filed on Apr. 29, 2011.

(51) Int. Cl.
*G06F 19/00* (2011.01)
*G05B 15/02* (2006.01)

(52) U.S. Cl.
CPC ............... *G06F 19/00* (2013.01); *G05B 15/02* (2013.01)

(58) Field of Classification Search
None
See application file for complete search history.

(56) References Cited

U.S. PATENT DOCUMENTS 6,076,952 A * 6/2000 Gretta et al. .................... 700/83
6,088,624 A * 7/2000 Khan et al. ..................... 700/86
2004/0015244 A1* 1/2004 Fujinami et al. ............... 700/18

FOREIGN PATENT DOCUMENTS

| CN | 101158869 A | 4/2008 |
| CN | 101907880 A | 12/2010 |
| EP | 1691245 A1 | 8/2006 |

OTHER PUBLICATIONS

Emcore Corporation, Model 1933R 1310 nm Coaxial DFB Return Path Laser Diode datasheet, Jan. 9, 2008, all pages.*

* cited by examiner

*Primary Examiner* — Sean Shechtman (57) ABSTRACT

A computer readable medium having instructions is provided. When executed by a computer system, the instructions direct the computer system to identify a control element used to control a process in a machine automation environment, identify a plurality of variables used by the control element to monitor the process, and translate the plurality of variables to a plurality of aliases according to a translation protocol specific to the control element.

18 Claims, 7 Drawing Sheets

| Type of Input/Output | Variable (IEC address) | Data Type | Alias |
|---|---|---|---|
| Embedded Digital Input | %IX0.1.0 | Boolean Input | _IO_EM_DI_00 |
| Embedded Digital Output | %QX0.0.5 | Boolean Output | _IO_EM_DO_05 |
| UPM Slot 1 Digital Input | %IX101.1.1 | Boolean Input | _IO_P1_DI_01 |
| UPM Slot 1 Digital Output | %QX101.0.5 | Boolean Output | _IO_P1_DO_05 |
| UPM Slot 1 Analog Input | %IW101.1.1 | Word Input | _IO_P1_AI_01 |
| UPM Slot 1 Analog Output | %QW101.0.5 | Word Output | _IO_P1_AO_05 |
| UPM Slot 3 Digital Input | %IX103.1.1 | Boolean Input | _IO_P3_DI_01 |
| UPM Slot 3 Digital Output | %QX103.0.5 | Boolean Input | _IO_P3_DO_05 |
| NEO Slot 4 Digital Input | %IX204.1.1 | Boolean Input | _IO_X4_DI_01 |
| NEO Slot 4 Digital Output | %QX204.0.5 | Boolean Output | _IO_X4_DO_05 |
| NEO Slot 1 Analog Input | %IW201.1.1 | Word Input | _IO_X1_AI_01 |
| NEO Slot 1 Analog Output | %QW201.0.5 | Word Output | _IO_X1_AO_05 |

| Type of Input/Output | Variable (IEC address) | Data Type | Alias |
|---|---|---|---|
| Embedded Digital Input | %IX0.1.0 | Boolean Input | _IO_EM_DI_00 |
| Embedded Digital Output | %QX0.0.5 | Boolean Output | _IO_EM_DO_05 |
| UPM Slot 1 Digital Input | %IX101.1.1 | Boolean Input | _IO_P1_DI_01 |
| UPM Slot 1 Digital Output | %QX101.0.5 | Boolean Output | _IO_P1_DO_05 |
| UPM Slot 1 Analog Input | %IW101.1.1 | Word Input | _IO_P1_AI_01 |
| UPM Slot 1 Analog Output | %QW101.0.5 | Word Output | _IO_P1_AO_05 |
| UPM Slot 3 Digital Input | %IX103.1.1 | Boolean Input | _IO_P3_DI_01 |
| UPM Slot 3 Digital Output | %QX103.0.5 | Boolean Output | _IO_P3_DO_05 |
| NEO Slot 4 Digital Input | %IX204.1.1 | Boolean Input | _IO_X4_DI_01 |
| NEO Slot 4 Digital Output | %QX204.0.5 | Boolean Output | _IO_X4_DO_05 |
| NEO Slot 1 Analog Input | %IW201.1.1 | Word Input | _IO_X1_AI_01 |
| NEO Slot 1 Analog Output | %QW201.0.5 | Word Output | _IO_X1_AO_05 |

ELEMENT SPECIFIC VARIABLE TRANSLATION

RELATED APPLICATIONS

This application claims the benefit of U.S. Provisional Application No. 61/480,988, filed Apr. 29, 2011, which is hereby incorporated by reference in its entirety.

TECHNICAL FIELD

The subject matter described herein is related to the field of controlling automated machines.

TECHNICAL BACKGROUND

Machine automation environments include many types of processing plants, fabrication facilities, assembly lines, and production operations. Devices in machine automation environments are commonly configured, controlled, or monitored using software and automated control mechanisms. In many cases, the software is implemented in the form of a graphical user interface.

A typical machine automation environment includes various devices such as pumps, drives, motors, starters, robots, sensors, switches, actuators, or other devices, including combinations thereof. Machine controllers, control elements, or controllers of other types are often used to control these devices. Machine controllers often interface with multiple devices and have many inputs and outputs. Variable names are typically assigned to the inputs and outputs such that they can be referenced in the software used to create control logic. The control logic is used by the controller to configure, control, or monitor the devices.

OVERVIEW

A method of operating a configuration system is provided. The method includes the steps of identifying a control element used to control a process in a machine automation environment, identifying a plurality of variables used by the control element to monitor the process, and translating the plurality of variables to a plurality of aliases according to a translation protocol specific to the control element.

In some examples, the method includes the steps of displaying a graphical representation of control logic implemented by the control element to control the process where the graphical representation includes the aliases. In this example, the method also includes the step of converting the graphical representation to program logic including translating the aliases to the variables according to the translation protocol.

In some examples, the method includes the further step of transferring the program logic to the control element.

In some examples, the method includes the further step of transferring the aliases to the control element.

In some examples, the control logic is implemented in the control element by way of executing the program logic.

In some examples, the variables comprise International Electrotechnical Commission (IEC) addresses.

In some examples, the control element comprises a port having a location and a logical address. The port comprises a plurality of elements each having a type and a logical address.

In some examples, each of the aliases has a format comprising _IO_wx_yy_zz, wherein each of the wx, yy, and zz portions indicate information about the port. In this configuration, w indicates the location of the port, x indicates the logical address of the port, yy indicates the type of one of the plurality of elements, and zz indicates the logical address of the one of the plurality of elements.

A computer readable medium is also provided. The computer readable medium contains instructions that, when executed by a computer system, direct the computer system to identify a control element used to control a process in a machine automation environment, identify a plurality of variables used by the control element to monitor the process, and translate the plurality of variables to a plurality of aliases according to a translation protocol specific to the control element.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

A typical machine automation environment includes various devices such as pumps, drives, motors, starters, robots, sensors, switches, actuators, or other devices, including combinations thereof. Controllers or control elements are often used to configure, monitor, or control these devices. Controllers often interface with multiple devices and have multiple inputs and outputs. The inputs are used to receive information from the process, system, or devices. The outputs are used to transmit instructions which have been converted to electrical signals to the process, system, or devices Configuration software enables a user to configure the controller to operate the devices in a particular manner using the input and outputs of the controller. The controller executes program logic which is created using control logic specified by the user. In designing the control logic, a user typically uses variables which are associated with the inputs and outputs of the controller to specify their use or behavior.

Figure 1:
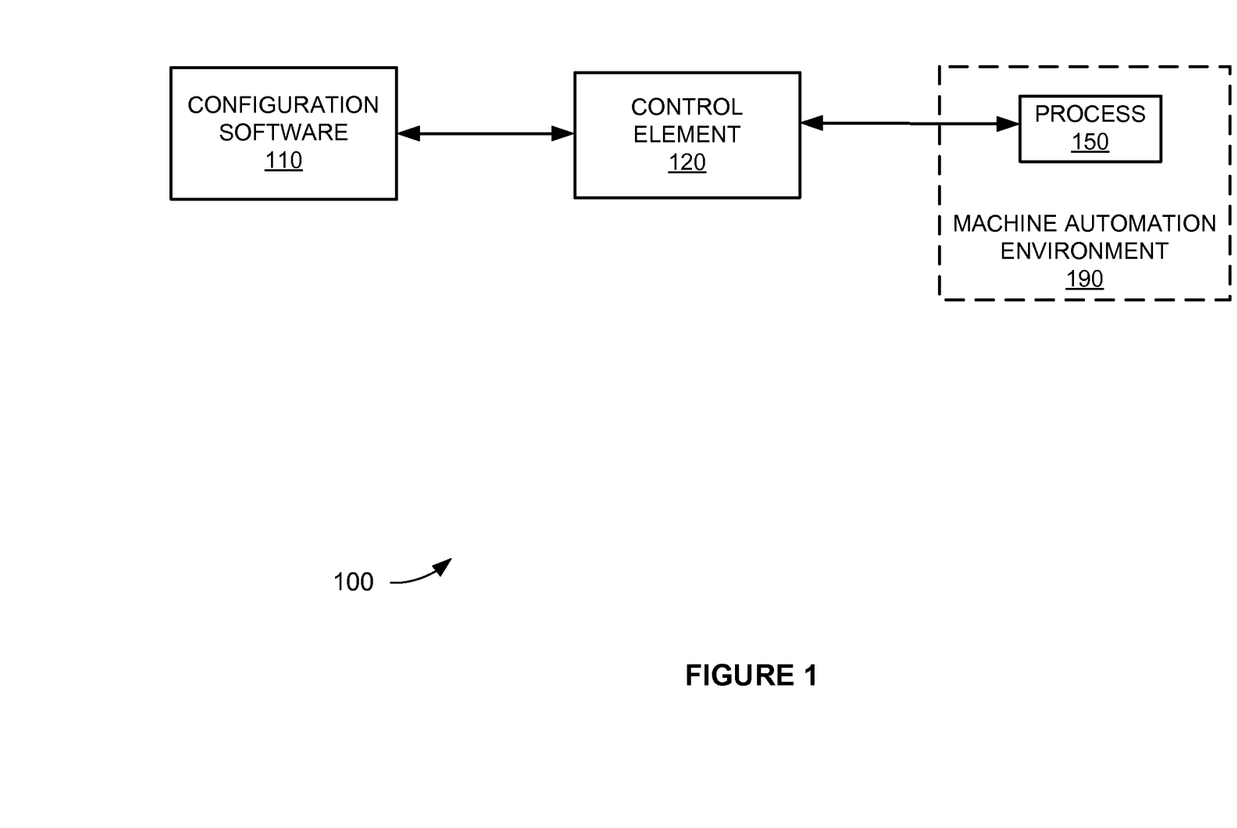
FIG. 1 illustrates a configuration system.

FIG. 1 illustrates configuration system 100. Configuration system 100 comprises configuration software 110, control element 120, and machine automation environment 190. Machine automation environment 190 comprises process 150.

Figure 2:
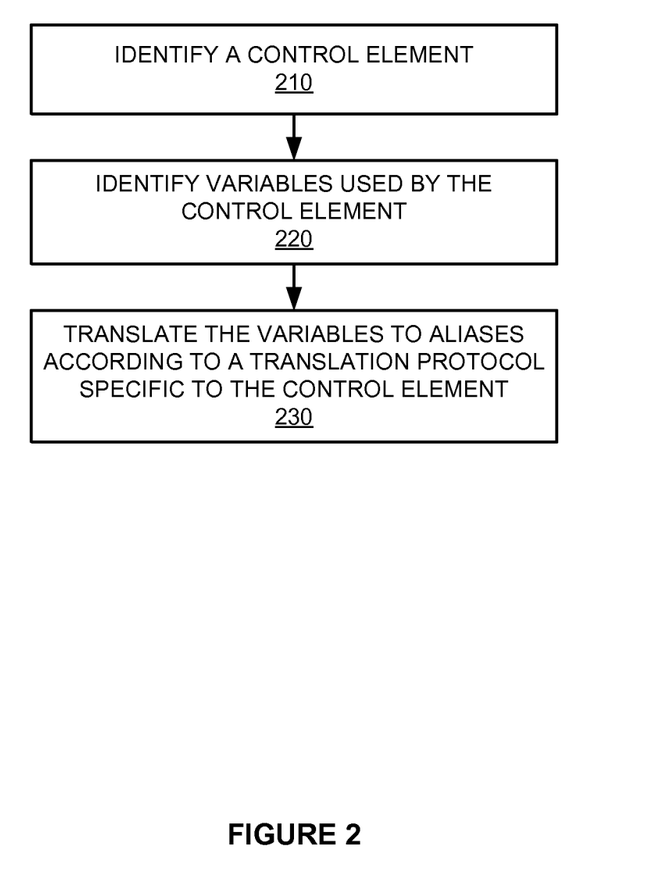
FIG. 2 illustrates an example of operation of a configuration system.

FIG. 2 illustrates an example of operation of configuration system 100. The steps of the operation are indicated below parenthetically. Configuration software 110 identifies control element 120 which is used to control process 150 in machine automation environment 190 (210). Configuration software 110 then identifies variables used by control element 120 to monitor process 150 (220). Finally, configuration software 110 translates the variables to aliases according to a translation protocol (230). The translation protocol is specific to the control element.

Referring back to FIG. 1, configuration software 110 comprises instructions and related data which, when executed by a processor, allow a user to configure control element 120. The configuration is performed using aliases. The aliases are identified by translating variables associated with control element 120.

Control element 120 comprises logic circuitry and ports for interfacing with configuration software 110 and process 150. Control element 120 executes program logic provided by configuration software 110 to control process 150. Control element 120 may be a microcontroller, programmable controller, or other type of controller, including combinations thereof.

Process 150 operates in machine automation environment 190. Process 150 comprises any industrial process that may be performed using machines or devices. In many cases, process 150 involves configuration, control, operation, or monitoring of an electrical device, mechanical device, sensor, switch, actuator, or combinations thereof.

Figure 3:
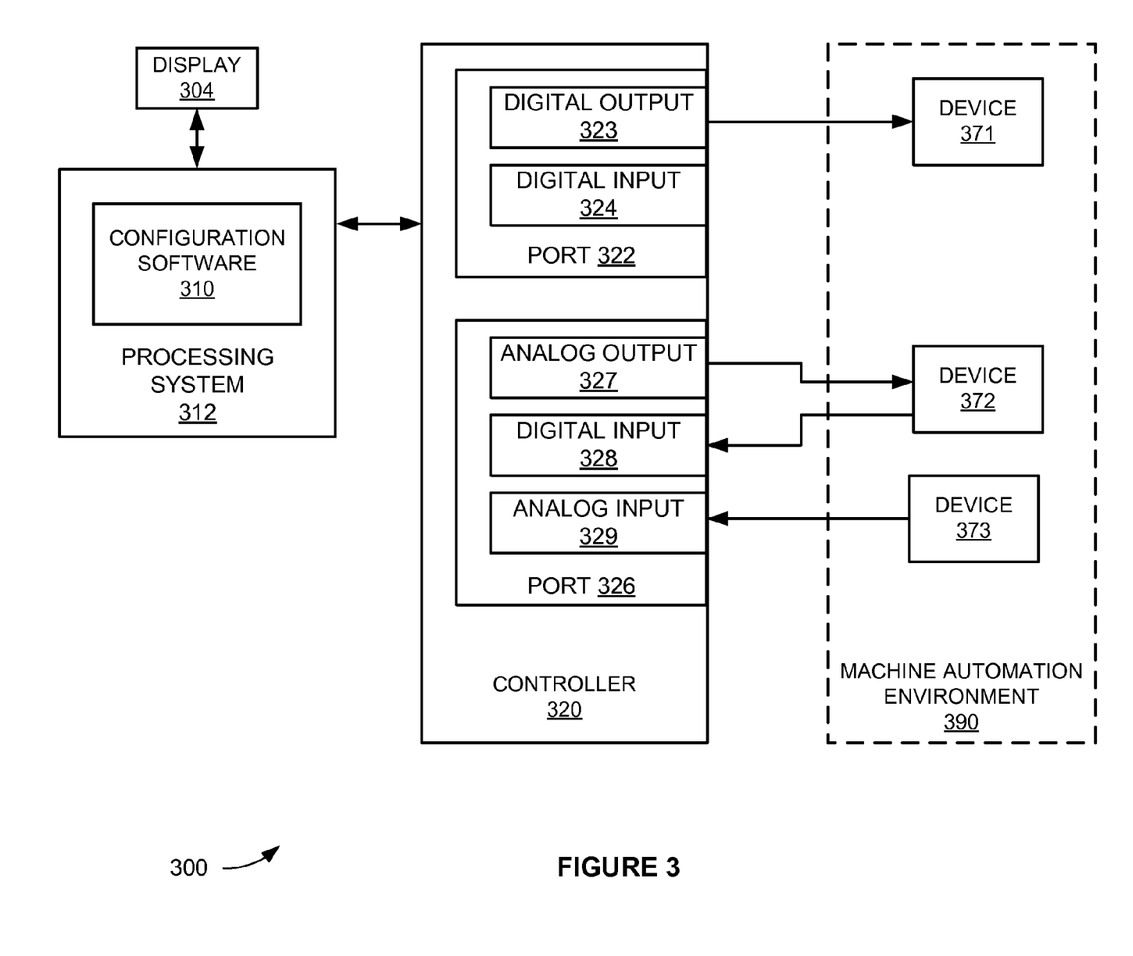
FIG. 3 illustrates a configuration system.

FIG. 3 illustrates configuration system 300. Configuration system 300 comprises processing system 312, display 304, controller 320, and machine automation environment 390.

Processing system 312 comprises configuration software 310 and processing circuitry capable of executing configuration software 310. Processing system 312 may be a computer, server, microprocessor, portable electronic device, or computing device. Configuration software 310 is an example of configuration software 110 although configuration software 310 may have an alternate configuration or operate in an alternate manner.

Machine automation environment 390 comprises devices 371-373. Machine automation environment 390 is an example of machine automation environment 190 although machine automation environment 390 may have an alternate configuration or operate in an alternate manner. Devices 371-373 may comprise a pump, a drive, a motor, a robot, an automated tool, a test instrument, a sensor, a switch, an actuator, or automated device, including combinations thereof. Devices 371-373 perform a process, like process 150, in machine automation environment 390.

Controller 320 comprises ports 322 and 326 and an interface for communicating with processing system 312. Ports 322 and 326 comprise any of a variety of combinations of input and output ports for electrically interfacing with devices 371-373, or with other devices. The input and output ports may be digital, analog, or a combination thereof. Controller 320 is an example of control element 120 although controller 320 may operate in an alternate manner or have an alternate configuration. In one example, controller 320 may comprise an Allen Bradley Micro 800 Programmable Controller.

Display 304 is a device for visually or graphically presenting information to a user of processing system 312. Display 304 may comprise a liquid crystal display (LCD), cathode ray tube (CRT), or other type of graphical display device.

In one example of operation, a user wishes to configure controller 320 in a manner that causes devices 371-373 to behave in chosen manner to control a process in machine automation environment 390. In this example, device 371 is a fan motor, device 372 is an automated cutting tool, and device 373 is a temperature sensor. The speed of the cutting tool is controlled by analog output 327 and the status of the cutting tool is monitored using digital input 328. In addition to controlling the cutting tool, the user wishes to create a set of rules for the operation of the cutting tool depending on the temperature indicated by the temperature sensor. For example, the cutting tool may be operated at a lower speed when the temperature exceeds a threshold. The user may also wish the control the operation of the fan motor based on the operation and status of the cutting tool as well as the temperature. Many other possible combinations of devices and operations are possible.

Different types and models of controllers typically have different types and quantities of inputs and outputs. In addition, controllers may have optional plug-in modules or expansion ports that increase the number or types of inputs and outputs available on the controller. When using configuration software 310 to create the set of logical rules that control the operation of devices 371-373, the inputs and outputs are referenced using variables. In some cases, variables are automatically created or assigned. In other cases these variables may be International Electromechanical Commission (IEC) addresses that follow an industry standard naming scheme. In many cases, the naming scheme of the variables does not allow a user to make an intuitive association between the variables and the physical inputs and outputs they represent.

A graphical representation of the system is created using configuration software 310 and displayed on display 304. Using the graphical representation, the user creates a set of logical rules, or control logic, which describes the desired relationships between the inputs, the outputs, the devices, and their states. Rather than use the variables to reference the inputs and outputs when creating the logical rules, the user makes use of aliases that are associated with the inputs and outputs. The aliases are formatted in a manner that allows the user to easily understand which particular input or output an alias refers to, based on the alias itself. In other words, the naming convention provides an intuitive indication of which input or output on controller 320 a particular alias is associated with.

The first step in creating the aliases is to identify controller 320. This identification may involve determining a manufacturer, a family number, a model number, a part number, or other identifying information. The process may also involve determining whether expansion modules are attached or whether additional slots of controller 320 are populated. Based on this information, the inputs and outputs are identified along with the variables associated with those inputs and outputs. The information may be obtained from many sources including controller 320, modules attached to controller 320, configuration software 310, or from sources external to configuration system 300.

The variables are translated to more intuitive aliases using a translation protocol. The aliases are used in the creation of the control logic. Returning to the previous example involving the cutting tool, one step in the control logic may specify that digital output 323 should go to a high state in order to trigger a relay to turn on the fan motor when a reading associated the temperature sensor through analog input 329 indicates that the temperature has passed a particular threshold.

The aliases are formatted in a manner that allows the user to understand which input or output is being referenced based on the alias itself. In other words, the alias for digital output 323 may contain information indicating it is the first digital output on the first port of controller 320. Similarly, the alias for analog input 329 may contain information indicating it is the first analog input on the second port of controller 320. In contrast to the aliases, using the variables instead to complete the programming task may have made the task more difficult.

This is true because the variables may be arcane or less intuitive and may require a user to perform further lookup or translation to determine which variables are associated with which physical input or outputs on the controller.

Once a graphic representation of the control logic is created using the aliases, configuration software 310 converts the graphical representation to program logic. The conversion process may involve compiling or another process which converts the control logic to instructions understandable by the logic and circuitry of controller 320. This conversion process includes translating each of the aliases back to the original variable according to the translation protocol. The program logic is transferred to controller 320 by processing system 312 under the direction of configuration software 310. Controller 320 is configured to utilize or operate the inputs to operate devices 371-373 as specified in the control logic by executing the program logic.

In a variation of the example described above, the aliases may also be transferred to controller 320. Although the aliases may not be used in the operation of controller 320, storing the aliases with the program logic makes them available for later use in decompiling, reverse engineering, or otherwise converting the program logic back to control logic. If processing system 312, configuration software 310, or the translation protocol has otherwise changed or is not available, the availability of the aliases may make this process easier. In addition, the translation protocol may be transferred to controller 320 in conjunction with the aliases.

Figure 4:
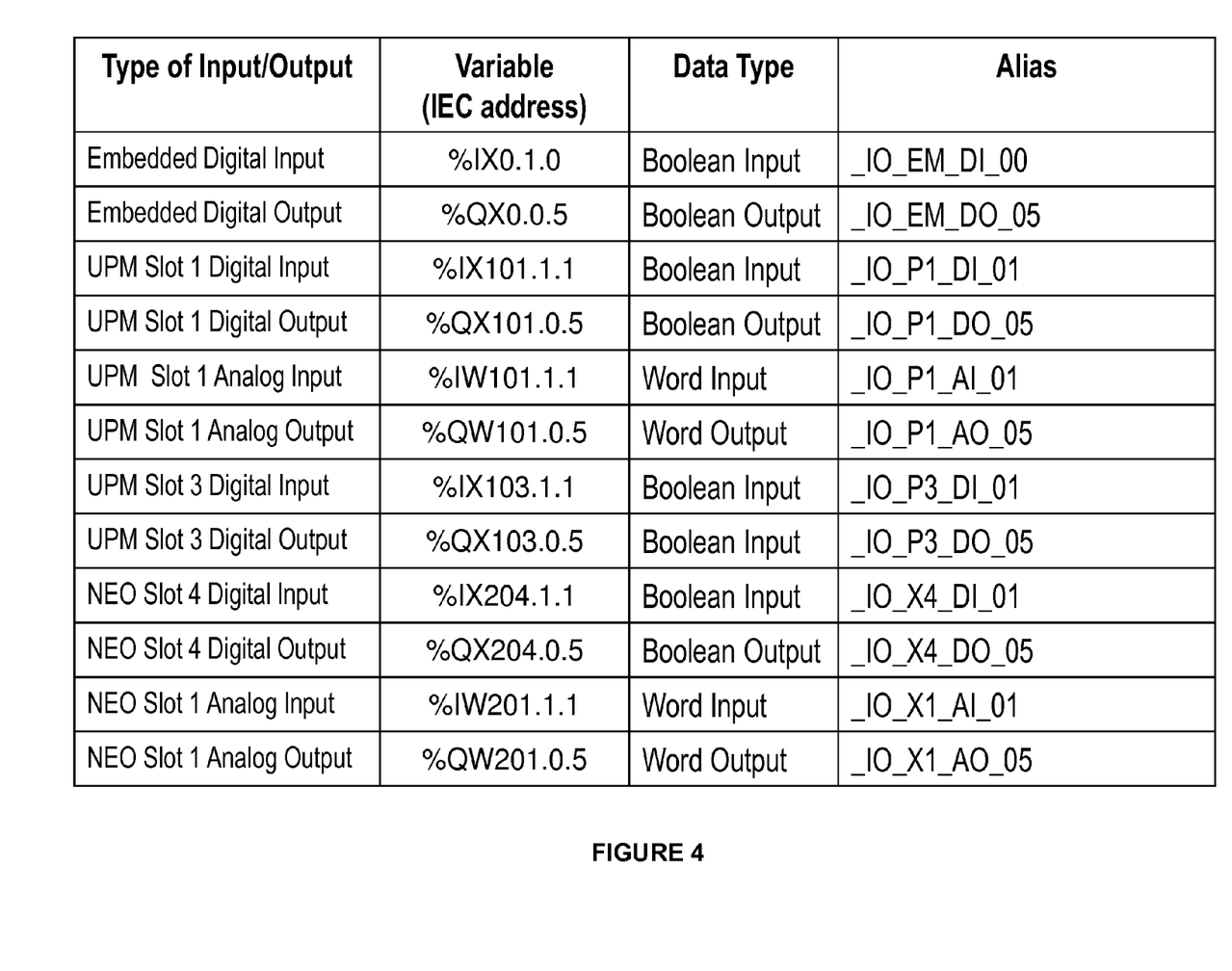
FIG. 4 illustrate a table of variables and aliases.

FIG. 4 illustrates a table containing example variables and aliases. Each row of the table is associated with a different element on a controller where an element is an input or output. In addition to indicating whether the input or output is analog or digital, the table also indicates the location of each. The location may indicate that the element is embedded in the controller, in an expansion slot, in an expansion module, or in a plug-in module. The second column is the variable, or IEC address, which is associated with each of the inputs and outputs. The last column indicates the alias that is created for each variable based on the translation protocol for the particular controller being used. In some cases, the translation protocol may be implemented in the form of a lookup table or database. In addition, different translation protocols may be used depending on the specific configuration of the controller.

In the example of FIG. 4, each alias is made up of twelve characters and begins with "_IO_" to indicate that it refers to an input/output. The fifth character indicates the location of the input/output in the controller. For example, the alias in row 3 is associated with a digital input in UPM slot 1. In the alias for this input, the "P" indicates that it is an input/output that is associated with a plug-in port. The sixth character indicates the logical address of the port, if any. For example, in row 3, the "1" indicates that this input/output is associated with a plug-in port which is at logical address "1" within the controller. The seventh and eight characters indicate the type of the particular input/output, or element. For example, in row 3, the "DI" indicates it is a digital input. Finally, the last two characters indicate the logical address of the particular element within the port. Continuing with row 3, the digital input is at logical address "01" within plug-in port P1. It should be understood that many other alias formats are possible.

Figure 5:
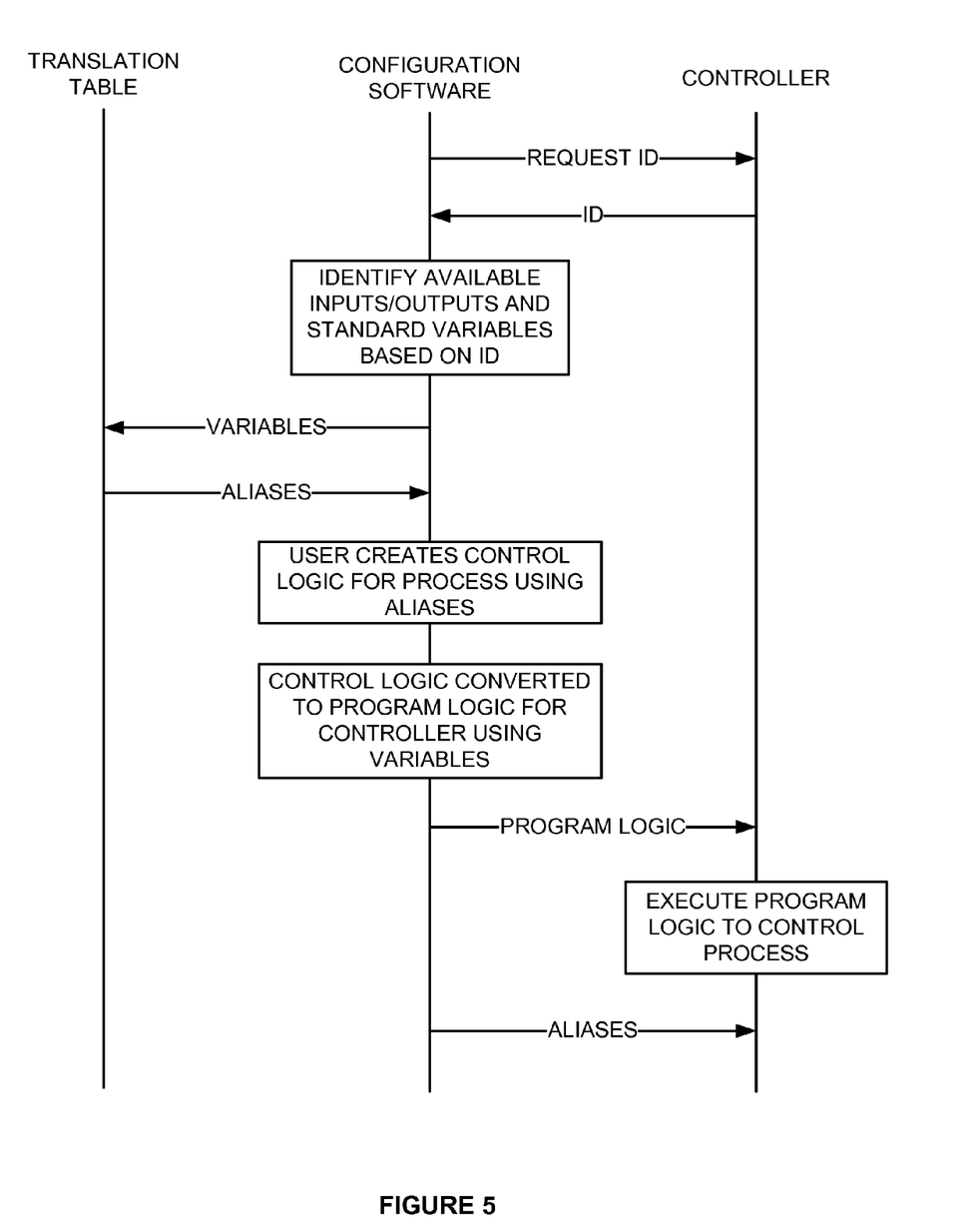
FIG. 5 illustrates an example of operation of a configuration system.

FIG. 5 illustrates another example of operation of one of the configurations systems described herein. When executed on a processing system, configuration software requests identification from the controller. The identification may be a model number of the controller or other identifying information. Based on receipt of the identification, the configuration software identifies the available inputs and outputs on the controller and the variables associated with those inputs and outputs. The configuration software then transfers these variables to a translation table in order to perform a translation or look-up process. Each variable is translated to an alias. It should be understood that the translation process may be performed within the configuration software or in another location.

Using graphical configuration tools provided by the configuration software, the user creates control logic describing the desired operation of devices controlled by the controller. The user specifies the behavior of the devices by referring to the states of the inputs and outputs by their aliases. When complete, the control logic is converted to a program or set of instructions that can be utilized by the controller. These instructions are also known as program logic. As part of this process, the aliases are translated or converted back to the variables. The program logic is transferred to the controller and executed by the controller to control the process and devices. It should be understood that the control logic may also be converted within the controller.

In the final step of FIG. 5, the aliases are optionally transferred to the controller. Many formats are possible and transfer of the aliases may include a dedicated translation table that maps each of the aliases to the variables for this set of program logic. If the program logic is uploaded from the controller at a later time, the aliases and associated information may be uploaded along with the program logic. This allows the aliases to be used in conjunction with the program logic to view or modify the program logic even if the original configuration software or translation table may not be available at that time.

Figure 6:
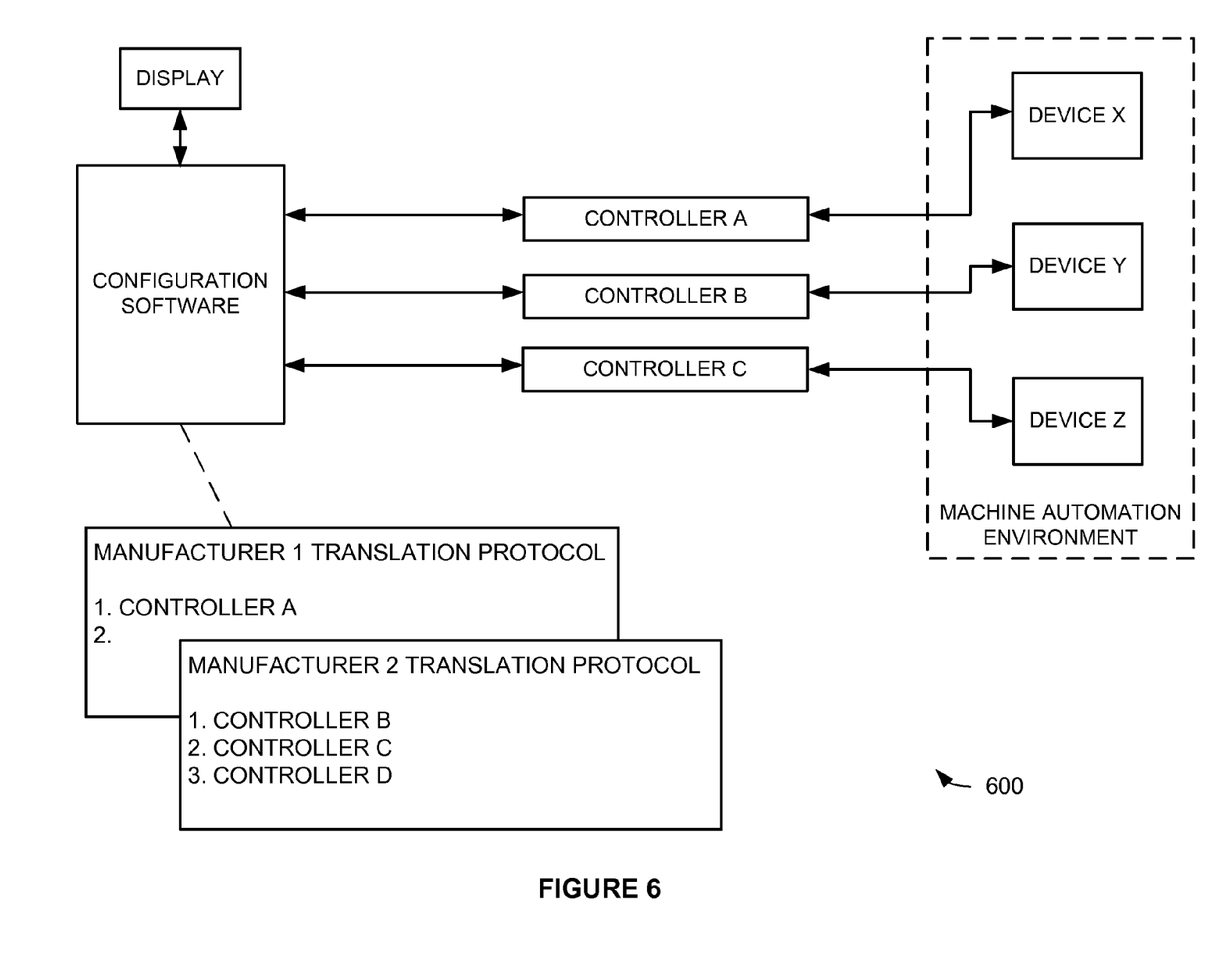
FIG. 6 illustrates a configuration system comprising multiple controllers.

FIG. 6 illustrates configuration system 600 that comprises multiple controllers from multiple manufacturers. Controllers A, B, and C are examples of control element 120 and controller 320. Controllers A, B, and C are interfaced to devices X, Y, and Z, respectively. Controller A is supplied or manufactured by one manufacturer while controllers B and C are supplied or manufactured by a different manufacturer. Consequently, they may use different variables, have different translation protocols, or both.

The configuration software of FIG. 6 is an example of configuration software 110 and configuration software 310. The single instance of configuration software interfaces to the three separate controllers. Using the configuration software, a user may create control logic for all three controllers using aliases associated with each of the three controllers. Because the controllers are from different manufacturers and may have different configurations or protocols, the configuration software uses multiple translation protocols to translate the variables associated with each controller to aliases. In this example, a different translation protocol is used for controllers B and C than for controller A because they are supplied by a different manufacturer. In addition, the translation protocols for controller B and C may be variations or sub-protocols of a protocol for that manufacturer.

In a variation of this example, additional characters may be appended to the aliases to indicate which controller each is associated with.

In a configuration system like that of FIG. 6, the programming task associated with creating control logic for the three controllers is simplified. The user is able to create logic for the multiple controllers using intuitive aliases, which use a same or similar format, even though the controllers may internally use variables with different formats. This is accomplished through use of the multiple translation protocols. The control logic is converted to three separate blocks of program logic, one for each controller. Each of the blocks of program logic is converted using the appropriate translation protocol for that controller.

It should be understood that controllers may be divided among multiple translation protocols based on manufacturer as illustrated in FIG. 6 or based on other factors including model, product family, function, features, other factors, or combinations thereof. It should be understood that translation protocols may be included in the configuration software, loaded from the controller, accessed from a location separate from the configuration software, or accessed remotely over a network.

Figure 7:
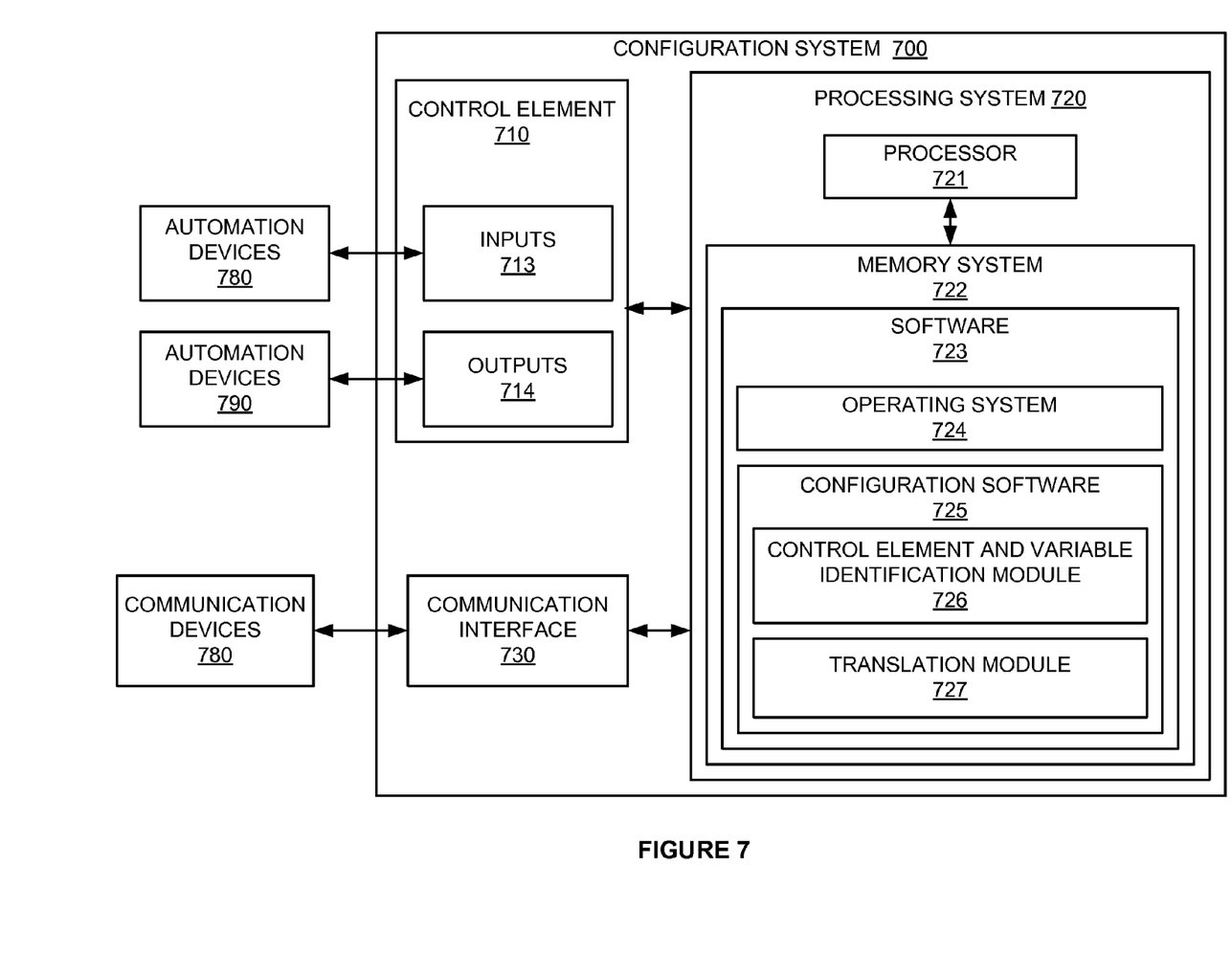
FIG. 7 illustrates a configuration system.

FIG. 7 illustrates configuration system 700. Configuration system 700 is an example of configuration system 100, configuration system 300, and configuration system 500. Configuration system 700 comprises control element 710, processing system 720, and communication interface 730. Processing system 720 is linked to control element 710 and communication interface 730 through communication links.

Control element 710 comprises inputs 713 and outputs 714. Inputs 713 and outputs 714 communicate with automation devices 780 and 790 over communication links. These communications may occur over metallic, wireless, or optical links. Automation devices 780 and 790 are examples of devices 371-373 of FIG. 3 and devices X-Z of FIG. 5.

Communication interface 730 comprises components that communicate with communication devices 780 over communication links. Communication interface 730 may be configured to communicate over metallic, wireless, or optical links. Communication interface 730 may be configured to use TDM, IP, Ethernet, optical networking, wireless protocols, communication signaling, or some other communication format, including combinations thereof. The communication may utilize network cards, ports, RF transceivers, or other devices. Communication devices 780 may include a storage system, display, a keyboard, a router, a mouse, a server, a user interface, or other device.

Processing system 720 includes processor 721 and memory system 722. Processor 721 includes microprocessor or other circuitry that retrieves and executes operating software from memory system 722. Memory system 722 comprises software 723. Memory system 722 may be implemented using random access memory, read-only memory, a hard drive, a tape drive, flash memory, optical storage, or other memory apparatus.

Software 723 comprises operating system 724 and configuration software 725. Configuration software 725 is an example of configuration software 110, configuration software 310, and the configuration software of FIG. 5. Configuration software 725 comprises control element and variable identification module 726 and translation module 727. Software 723 may also comprise additional computer programs, firmware, or some other form of non-transitory, machine-readable processing instructions.

When executed by processor 721, operating system 724 directs processing system 720 to operate configuration system 700 as described herein using configuration software 725. Configuration software 725 directs configuration system 700 to identify a control element and identify variables used by the control element using module 726. Then, configuration software 725 directs configuration system 700 to translate the variables to a plurality of aliases using translation module 727.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable medium having stored thereon instructions that, when executed by a computer system, direct the computer system to:
   identify a control element used to control a process in a machine automation environment;
   identify a plurality of variables used by the control element to monitor the process; and
   translate the plurality of variables to a plurality of aliases according to a translation protocol specific to the control element;
   wherein each of the aliases comprises a format comprising _IO_wx_yy_zz, and wherein IO indicates an input/output, w indicates a location of a port, x indicates a logical address of the port, yy indicates a type of one of a plurality of elements, and zz indicates a logical address of the one of the plurality of elements.

2. The non-transitory computer readable medium of claim 1, wherein the instructions, when executed by the computer system, further direct the computer system to:
   display a graphical representation of control logic implemented by the control element to control the process, wherein the graphical representation includes the aliases; and
   convert the graphical representation to program logic including translating the aliases to the variables according to the translation protocol.

3. The non-transitory computer readable medium of claim 2 wherein the instructions, when executed by the computer system, further direct the computer system to transfer the program logic to the control element.

4. The non-transitory computer readable medium of claim 3 wherein the instructions, when executed by the computer system, further direct the computer system to transfer the aliases to the control element.

5. The non-transitory computer readable medium of claim 3 wherein the control logic is implemented in the control element by way of executing the program logic.

6. The non-transitory computer readable medium of claim 1 wherein the variables comprise International Electrotechnical Commission (IEC) addresses.

7. The non-transitory computer readable medium of claim 1 wherein the control element comprises the port having the location and the logical address, and wherein the port comprises the plurality of elements each having the type and the logical address.

8. The non-transitory computer readable medium of claim 1 wherein the instructions, when executed by the computer system, further direct the computer system to determine at least one of a manufacturer, a family number, a model number, and a part number.

9. The non-transitory computer readable medium of claim 1 wherein the instructions, when executed by the computer system, further direct the computer system to determine if an expansion module is attached and additional slots are populated.

10. A method comprising:
    in a computing system, identifying a control element used to control a process in a machine automation environment;

in the computing system, identifying a plurality of variables used by the control element to monitor the process; and in the computing system, translating the plurality of variables to a plurality of aliases according to a translation protocol specific to the control element;

wherein each of the aliases comprises a format comprising _IO_wx_yy_zz, and wherein IO indicates an input/output, w indicates a location of a port, x indicates a logical address of the port, yy indicates a type of one of a plurality of elements, and zz indicates a logical address of the one of the plurality of elements.

11. The method of claim 10 further comprising:

displaying a graphical representation of control logic implemented by the control element to control the process, wherein the graphical representation includes the aliases; and converting the graphical representation to program logic including translating the aliases to the variables according to the translation protocol.

12. The method of claim 11 further comprising transferring the program logic to the control element.

13. The method of claim 12 further comprising transferring the aliases to the control element.

14. The method of claim 12 wherein the control logic is implemented in the control element by way of executing the program logic.

15. The method of claim 10 wherein the variables comprise International Electrotechnical Commission (IEC) addresses.

16. The method of claim 10 wherein the control element comprises the port having the location and the logical address, and wherein the port comprises the plurality of elements each having the type and the logical address.

17. The method of claim 10 wherein the instructions, when executed by the computer system, further direct the computer system to determine at least one of a manufacturer, a family number, a model number, and a part number.

18. The method of claim 10 wherein the instructions, when executed by the computer system, further direct the computer system to determine if an expansion module is attached and additional slots are populated.

* * * * *